United States Patent

Lopez

[15] 3,663,017

[45] May 16, 1972

[54] GAME APPARATUS AND ALPHABET TEACHING DEVICE

[72] Inventor: Joseph G. Lopez, 3210 West 65th Avenue, Denver, Colo. 80221

[22] Filed: Nov. 12, 1970

[21] Appl. No.: 88,832

[52] U.S. Cl. .................................273/1 R, 273/144 B
[51] Int. Cl. ...................................A63b 63/00
[58] Field of Search ..............273/101, 119 R, 123 R, 125 R, 273/124 R, 1 R, 144 B

[56] References Cited

UNITED STATES PATENTS 2,489,676    11/1949    Robinson .........................273/125 R Primary Examiner—Anton O. Oechsle
Assistant Examiner—Marvin Siskind
Attorney—Reilly and Lewis

[57] ABSTRACT

A game device particularly suitable for teaching purposes includes a hollow body containing a plurality of movable objects, preferably balls, each marked with distinctive indicia. A plurality of compartments are arranged longitudinally of an upper portion of the body. A manually operable flap, contained within the body, is swingably mounted to sweep the movable objects upwardly from the bottom of the body into the compartments in a single upstroke and return means return movable objects to the bottom of the body. As an alphabet toy each compartment has alphabet indicia corresponding to alphabet indicia of one of the movable objects and in the play those objects which are not in a corresponding compartment are returned to the bottom of the body and the procedure is repeated until all of the movable objects are in a corresponding compartment.

8 Claims, 3 Drawing Figures

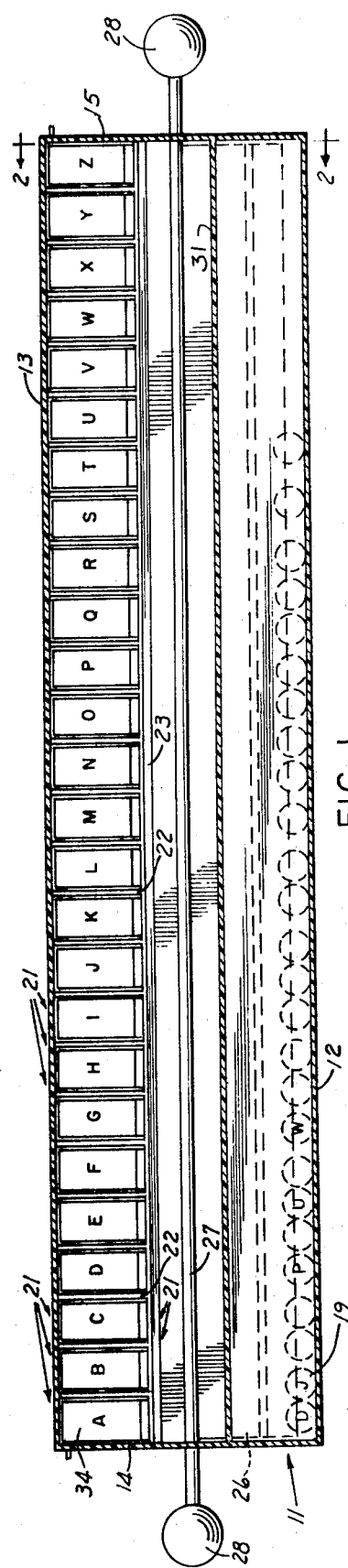
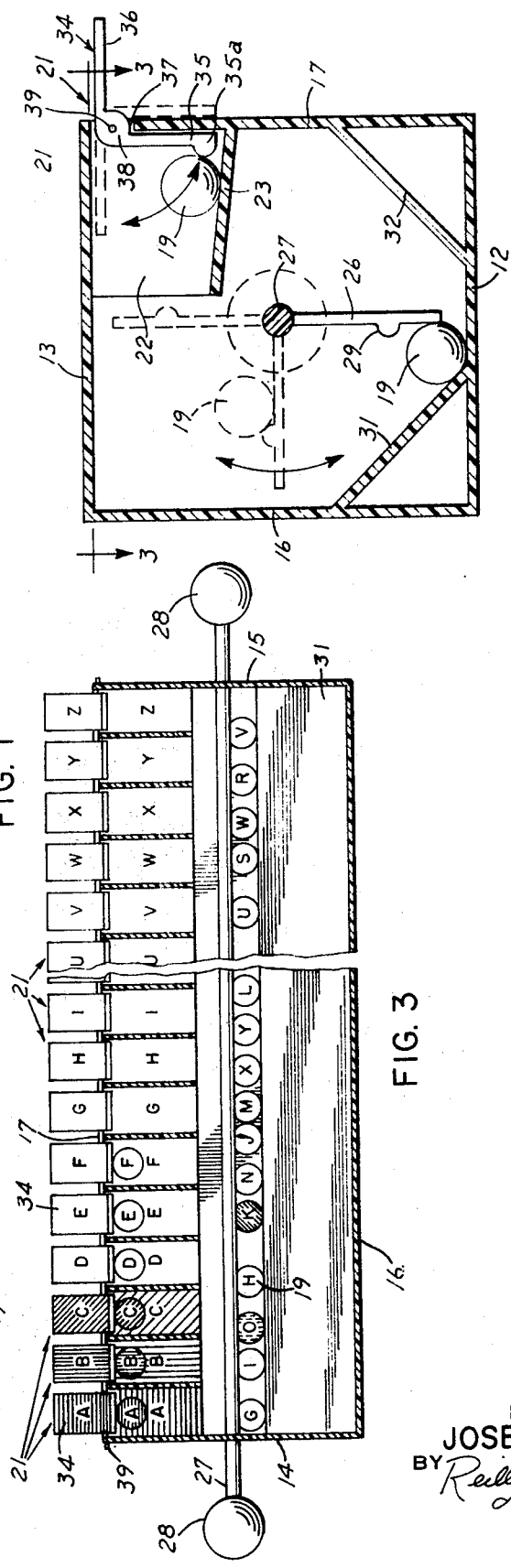

GAME APPARATUS AND ALPHABET TEACHING DEVICE

This invention relates to game devices and more particularly to a novel game-type device which is particularly suitable for teaching letters of the alphabet, colors, and the like.

A variety of game devices have heretofore been provided which are suitable for teaching letters of the alphabet and colors but usually they do not require any manual manipulation coupled with an element of chance so as to lend a degree of interest to the user.

Accordingly, it is an object of this invention to provide a game device which is simple, durable, and relatively inexpensive to manufacture and will retain the interest of the user for extended periods of time.

Another object of this invention is to provide a novel game device which is particularly usable as an educational toy requiring the matching of like objects which utilizes a degree of manual manipulation and skill so as to require a certain amount of user concentration.

Still a further object of this invention is to provide a novel game device which is particularly suitable for teaching the letters of the alphabet and is a self-contained unit including a hollow body and associated parts of which all may be readily molded from plastic.

In accordance with the present invention in a preferred embodiment shown there is provided a hollow rectangular body for containing a plurality of movable objects, preferably balls. For use as an educational toy each object has individual indicia such as alphabet letters and/or different colors to identify and distinguish each from the other. A plurality of compartments are mounted in an upper portion of the body extending longitudinally thereof at equally spaced intervals with a forward entrance. Each compartment is marked with indicia corresponding with the indicia on one of the movable objects. An elongated flap is mounted for pivotal movement in the body and is arranged to elevate all of the objects from the bottom of the body upwardly into the compartments in a single upward swinging movement. Object return members are associated with each compartment to return those objects from the compartment back into the bottom of the body. In the play as an alphabet toy an object is returned when its indicia does not correspond with that of the compartment, and this procedure of elevating the objects and returning some is repeated until all of the compartments are filled with movable objects with indicia corresponding with that of the compartment.

Other objects, advantages and capabilities of the present invention will become more apparent as the description proceeds taken in conjunction with the accompanying drawings, in which:

FIG. 1 is a front elevational view of an educational game device embodying features of the present invention with the front wall removed to show interior parts;

FIG. 2 is a sectional view taken along lines 2—2 of FIG. 1 and drawn to an enlarged scale; and FIG. 3 is a sectional view taken along lines 3—3 of FIG. 2.

Referring now to the drawings, there is shown a game device inclusive of a hollow generally rectangular body 11 including a bottom wall 12, top wall 13, end walls 14 and 15, and front and rear walls 16 and 17, preferably molded as an integral unit from a plastic material, which define an enclosure for a plurality of movable objects 19, preferably balls, contained within the body. It is understood that other shapes of hollow bodies may be utilized in the practice of this invention but that the rectangular shape has several advantages including its self-supporting capability when placed on a flat support surface such as a table and its ease of molding as an integral unit. The movable objects 19 may take other forms than spherical balls but balls are preferred due to their rolling capability. The balls 19 are marked or bear indicia illustrated in the educational toy shown as a letter of the alphabet and each has a different coloring. For illustration purposes, several of the balls are marked with indicia including the colors blue, red, and green. As shown, these balls normally rest on the bottom wall in the bottom of the body until elevated as described hereinafter.

A plurality of object-supporting compartments or cells 21 extend longitudinally of the body along the upper rear wall of the body. These compartments 21 are of a corresponding size and shape, extend the lengthwise extent of the body, and are formed by opposed spaced side walls 22, a bottom wall 23, with the rear wall 17 of the body forming the back of the compartment. The end walls 14 and 15 of the body form a side wall for the end compartments. The bottom wall 23 inclines downwardly and rearwardly at a slight angle and is joined to the rear wall 17 to retain the balls therein. The front of the compartments are left open to permit the balls to enter and discharge from the compartments. The game device shown has a total of 26 compartments which are marked with indicia consecutively from left to right with the letters of the alphabet, making the device suitable for teaching letters of the alphabet. Further, each compartment may be color-coded with a different color to further distinguish and identify each compartment and teach colors.

The balls 19 are moved from the bottom of the body into the compartments by an elevating means in the form of a generally flat panel or flap member 26 which extends the lengthwise extent of the inside of the body and has a pivot rod 27 extending along one end thereof with the rod projecting through apertures in the end walls of the body. The pivot rod terminates in enlarged knobs 28 at each end suitable for gripping by the user so that the flap member 26 may be rotated in a vertical plane within the body to elevate the balls into the compartments. The flap member 26 has a longitudinally extending upstanding rib 29 to assist in carrying the ball from a horizontal to a vertical position, as best seen in FIG. 2. The flap member 26 is arranged relative to the inner wall surfaces in the body so that in a single sweeping action the inner wall and flap member surfaces cooperate to move all the balls 19 into the compartments 21. The compartments shown are sized to receive at least two balls. The square lower inside corners of the box are provided with front and rear inclined plates 31 and 32, respectively, arranged on an incline between the front wall and bottom wall and between the rear wall and bottom wall, respectively, to provide inner surfaces which more closely conform to the end of the flap member and the spacing between the inner wall surfaces and the end of the flap is arranged so that it is substantially less than the diameter of the balls so that the balls will be elevated when the flap is rotated clockwise as viewed in FIG. 2.

For the return of the balls from each compartment there is provided a ball-return device in the form of a flap-like return member 34 having a generally right-angle cross-sectional shape with one ball-engaging leg 35 normally depending parallel to and inside the back of the compartment and an outer leg 36 which extends through an opening 37 in the back wall of the body and normally projects transversely to the back wall. The legs 35 and 36 are joined by a common hub portion 38 and a pivot member 39 extends through the hub and is supported in the side walls of the compartment so that the return member will swing to an angle of approximately 90° when the outer leg 36 is depressed downwardly from a horizontal to a vertical position, as shown in dashed lines in FIG. 2. This swinging movement of the vertical leg 35 against the ball rolls it out of the compartment and the ball falls by gravity down into the bottom of the body. The return leg has a weighted portion 35a to ensure that it automatically returns to the normal vertical depending position once the ball has been removed from the compartment.

In a full sequence of operation, then, for use as an alphabet toy all of the balls 19 are initially in the bottom of the body and are elevated into the compartments by a single upward sweep of the flap member 26 as indicated by the arrows in FIG. 2. The balls 19 having letter indicia which do not correspond with the indicia of that compartment are returned to the bottom of the body by depressing selected of the return members. This procedure of first manually rotating the flap member 25 and then depressing selected return members is repeated until all of the balls are in compartments having corresponding indicia.

While the alphabet is one indicia arrangement for educating younger children, it is understood that other indicia could be employed with the structural arrangement shown and different numbers of compartments could be utilized so that the game device may be used as a chance device associated with a game board or the like whereby the compartments and balls would have different indicia and a particular ball in a particular compartment would indicate a particular play in the game.

Although the present invention has been described with a certain degree of particularity, it is understood that the present disclosure has been made by way of example and that changes in details of structure may be made without departing from the spirit thereof.

What is claimed is:

1. A game device comprising a hollow body containing a plurality of movable objects each marked with distinctive indicia, a plurality of compartments arranged in an upper portion of said body, each said compartment having distinctive indicia, said indicia on each of said movable objects being identical to the indicia on each of said compartments, an object elevating means mounted in the body to sweep the objects from the bottom of the body into said compartments in a single upward stroke, and return means for selectively returning objects from the compartments back into the bottom of the body.

2. A game device as set forth in claim 1 wherein said movable objects are balls marked with a letter of the alphabet.

3. A game device as set forth in claim 1 wherein said object elevating means includes a flap member in the body with a rod along one side edge supported in the end walls of the body to rotate the flap member in a vertical plane.

4. A game device as set forth in claim 3 wherein said rod terminates in enlarged grip members suitable for manually rotating said flap member.

5. A game device as set forth in claim 1 wherein said return means includes an individual return member for each said compartment.

6. A game device as set forth in claim 5 wherein each said individual return member includes a pair of legs arranged about a common hub at about right angles to one another, a pivot member extending through said hub for pivotal movement to move one leg through the associated compartment against a movable object in the compartment to remove the object from said compartment.

7. A game device as set forth in claim 6 wherein one of said legs extends through the rear wall of the compartment and is moved downwardly to remove the object.

8. An educational game device comprising:
   a hollow generally rectangular body including top, bottom, end and front and rear walls formed as an integral unit and containing a plurality of balls each marked with a letter of the alphabet,
   a plurality of ball-receiving compartments arranged side by side longitudinally of the body in an upper portion thereof along the rear wall with each compartment being open at the front and with each compartment being consecutively marked with a letter of the alphabet,
   a flap member in the body having a rod along an edge thereof with end portions of the rod extending through said end walls and terminating in knobs for swinging movement of the flap member to sweep the balls from the bottom of the body into the compartments in a single upward rotary stroke, and
   a return member for each compartment marked with a corresponding letter of the alphabet, each said return member including a pair of legs arranged at approximately right angles to one another on a common hub, the hub being pivotally mounted at the rear of the compartment and having one leg depending along the rear wall of the compartment and the other leg projecting through the rear wall of the compartment to be moved downwardly to move the depending leg against a ball in the compartment to selectively return the ball from the compartment to the bottom of said body.

* * * * *